May 22, 1956 — C. A. RICKABAUGH — 2,746,168
CONTINUOUS DRYING APPARATUS
Filed Feb. 4, 1953
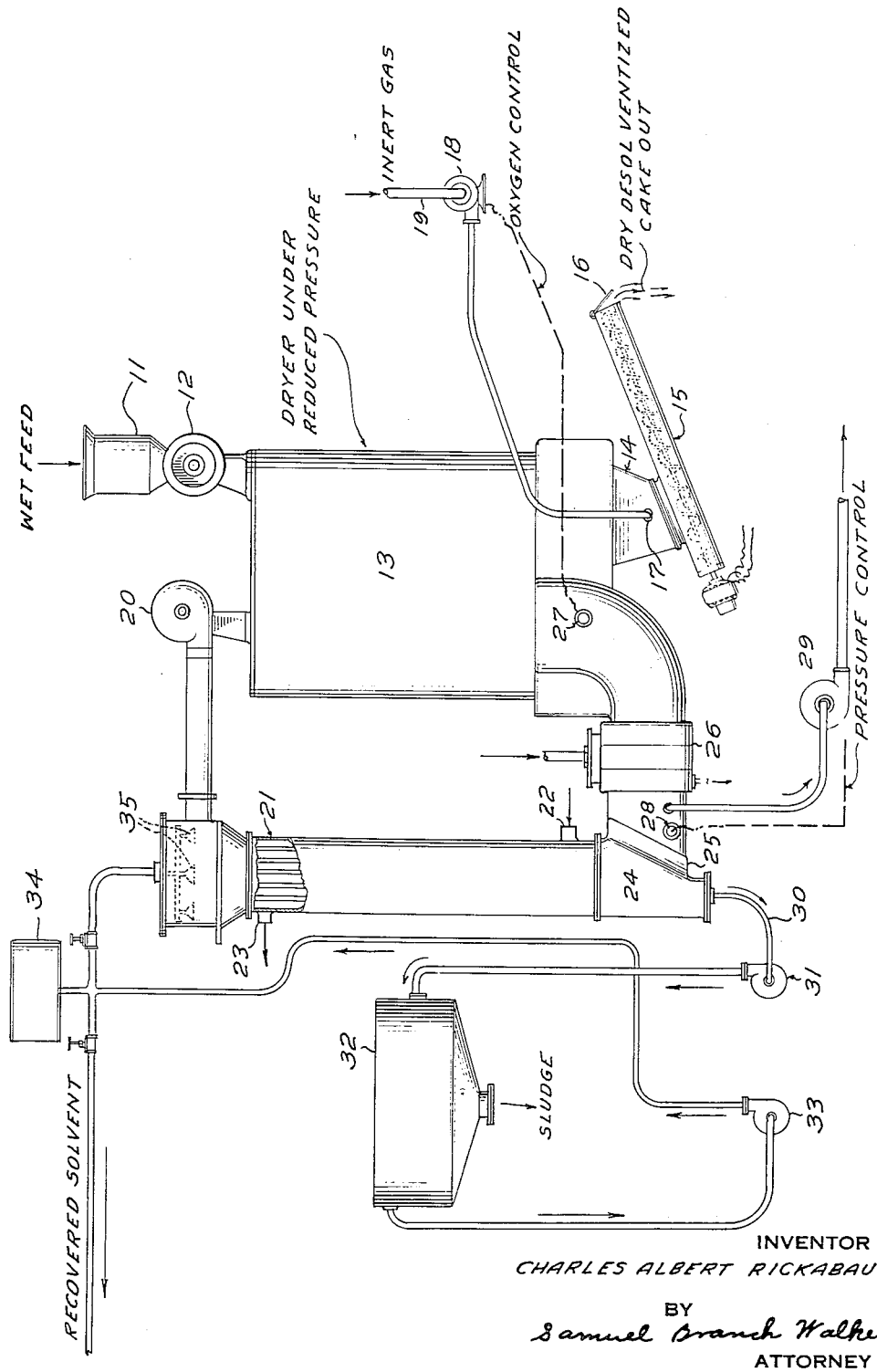
INVENTOR
CHARLES ALBERT RICKABAUGH,
BY
Samuel Branch Walker
ATTORNEY

United States Patent Office 2,746,168
Patented May 22, 1956

2,746,168

CONTINUOUS DRYING APPARATUS

Charles Albert Rickabaugh, Park Ridge, N. J., assignor to American Cyanamid Company, New York, N. Y., a corporation of Maine Application February 4, 1953, Serial No. 335,018

3 Claims. (Cl. 34—51)

The present invention relates to a method and apparatus for the drying of inflammable solvent-wet solids in a safe, economical and continuous manner.

The invention has as an object the drying of heat-labile solid materials, or solid materials which may contain heat-sensitive components, in such a fashion as to avoid unduly overheating them, and yet obtain a comparatively dry product. It also permits the drying of these materials in an inert atmosphere, so that if sensitive to oxygen, the products are protected from oxidation during the drying cycle.

It is a further objective to be able to dry solids in a minimum time, because destruction is a function of both time and temperature, and a minimum process holdup is desired from the standpoint of reducing costs.

It is an additional object of my invention to be able to feed an inflammable solvent-wet material into a drying chamber, dry the material in the chamber and remove the material from the chamber in such a fashion as to prevent undue leakage of air into the chamber, and at all times to maintain an inert atmosphere in the chamber under a slightly reduced pressure. It is a most important feature that a drying chamber be maintained under reduced pressure at all times. It is a desirable object to be able to control the inertness of the gas atmosphere.

It is a further object of my invention to provide a method of recovery of the inert solvent, and furthermore to operate the condenser for recovering the solvent in as efficient and expeditious a manner as possible, particularly by the use of a recycled solvent spray, which will remove any dust or other contaminants from the tubes of the condenser. In the past, it has been the custom to dry materials which were wet with an inflammable solvent by attempting to seal them in an inert gas atmosphere in a closed chamber; and because it is impossible to obtain a completely gas-tight drying system, it has been customary to maintain system under pressure so that any leakage would be from the inside out. From a theoretical standpoint, this has considerable advantages. However, from a practical operating standpoint, as the vapors escape, there is a tendency for them to build up around the dryer in passages where free air circulation is not obtained and there is always a risk that sufficient of the vapors will build up to cause an explosion hazard. Furthermore, there is a tendency for some vapors to escape through the inlet feed trap system and escape with the solid cake through the exit trap system, all of which leads to loss of solvent and potential explosion hazards and health hazards.

In the past, there has been considerable difficulty in maintaining an inert atmosphere in a drying system, and because as there is necessarily some leakage, some air passed in with the feed, and from other sources, there is a tendency for the oxygen content of the inert atmosphere to gradually increase to dangerous levels. In carrying out the process in the apparatus which forms part of this invention, it is possible to turn these disadvantages into actual assets and attain a more economical, more efficient and more satisfactory method of drying than has previously been known.

The drying method and apparatus is particularly useful with the residual products from the growth of mold in the manufacture of antibiotics, but it may be used with any solvent-wet solid which is to be dried under comparatively mild conditions. In the manufacture of certain antibiotics, the antibiotic is extracted from a cake by a solvent which leaves the cake saturated with solvent and, at times, containing residual activity of certain components. It is then necessary to remove the solvent from the cake under such conditions that the activity remaining in the cake is maintained. In the past, this has been accomplished by drying batchwise in an inert gas atmosphere, but in a batch process it is necessary to purge the drying chamber of the solvent, before the chamber is opened up for discharging the batch, and to reduce the atmosphere within the chamber to an inert gas atmosphere before putting the dryer back on the line. By my method, I have found that the drying chamber may be purposely kept under a slight negative pressure and operated continuously in order that any leakage will be of air into the system, so that the oxygen content of the system is thereby slightly increased from the air leakage. But, any of the solvent vapors are prevented from escaping into the atmosphere or other areas where they may build up hazardous concentrations. It is necessary in operating my invention to first provide an inert gas to be fed into and augment the inert atmosphere in the drying chamber which is recycled through a condenser, and by using an oxygen controller, it is possible to measure continuously, or as indicated, the oxygen content of the recycled inert atmosphere and add to it an inert gas, such as air in which natural or manufactured gas or other material may be burned, so that the products of combustion contain practically no oxygen, and principally nitrogen and carbon dioxide, together with a minimum of moisture vapor. Water vapor may be removed and this dry inert gas added to the recycled inert atmosphere at such a rate as to keep the oxygen content at desired minimum levels.

The preferred oxygen content of course varies, depending on the solvent and temperature in which the system is being operated, but I find that with solvents such as the lower alcohols, a maximum of approximately 5% oxygen is convenient, as this is well below the explosion hazard point. By analyzing the recycled atmosphere continuously, the amount of inert gas which is added is kept to a minimum and, at the same time, safe operating conditions are maintained.

As will be later described, it is preferred that this inert gas being added be used as a flush to remove the solvent vapor laden inert atmosphere from the discharge of the drying chamber, and thereby give a gas-washed de-solventized discharge from the drying system.

Inasmuch as the system has both the inert gas being added thereto and a certain leakage of air, it is obvious that a certain amount of the atmosphere must be removed from the system, and this is done by maintaining the desired negative pressure by pumping a purge out of the system. A control pressure point may be anywhere in the system, but is conveniently at the point of minimum vacuum. It is convenient to use a vacuum only on the drying chamber itself, as the condenser system may usually be easily made completely vapor-proof, so that no hazard arises thereby, and the pressure maintained at just slightly below atmospheric at the exit from the condenser. However, if there is any question as to the tightness of the condenser system, it is also convenient to operate the entire system at reduced pressure and use as a control point the exit from the circulating blower. The purge gas may be run through a carbon-absorption system, whereby the solvent remaining in the gas is absorbed on carbon from which it may be stripped by steam or other suitable means; thereby giving a complete recovery of all of the solvent.

I may use any type of drying system, but prefer a conventional turbine type dryer in which the solids to be dried are agitated as they drop from floor to floor through the drying tower, countercurrent to the flow of the inert atmosphere.

It is desirable that the solids be fed through a sealed feeder, which may be either star type in which separate compartments in a rotor pass under a hopper, and rotate to discharge into the drying chamber proper, or some other trap systems may be used, so that the solids are fed at the desired rate into the drying chamber, but at all times a closure prevents an undue quantity of air being fed with the solids. As the solids, in their dry state, are discharged from the bottom of the drying chamber proper, it is convenient to have them fall into a discharge hopper, from which they feed into a discharge conveyor. It is desired, as mentioned above, that the inert gas being fed into the system feed into this hopper to act as an inert gas wash to remove the inert atmosphere and any solvents therein from the dried solids, so as in effect to give a desolventized discharge from the bottom of this hopper. This hopper discharges into a sealed discharge system, conveniently an inclined screw-type conveyor, so that no air may leak into the system through the discharge opening. It is convenient to feed the discharge through a screw conveyor against a spring loaded gate, so as to maintain an additional seal between the drying atmosphere and the outside air.

The inert atmosphere may be cycled through the dryer by a blower of any conventional type, and this blower moves the solvent-laden inert atmosphere from the top of the drying chamber through a condenser, which lowers its temperature and condenses out the solvent. Any conventional condenser may be used; particularly convenient is a vertical tube condenser in which a spray of recovered solvent is added above the top of the top plate of the condenser, so that the inert atmosphere is completely saturated with liquid which gives a liquid to liquid heat transfer coefficient throughout, and thereby increases the efficiency of the condenser, and also this spray removes any dust which comes over with the inert atmosphere, thereby preventing the clogging of the condenser.

The condensed vapors together with recycled solvent are then fed from this condenser through a sludge separator. A separator in which the solvents are allowed to remain quiescent for a considerable period is satisfactory with some types of suspended solids, but a centrifugal separator or a filter may be used. This sludge from the sludge separator can be fed back with the dryer feed so that the solvent is recovered, and all of the dried material is obtained at a single point. The cooled inert atmosphere from the bottom of the condenser containing a minimum solvent load is fed through a heater in which any conventional heat source is used, such as, for instance, steam, or other hot fluid in pipes or electrical radiators, to raise the temperature of the recycled inert atmosphere to such a point that it will again remove the desired quantity of solvent as it passes through the drying chamber. Reheating pipes may also be used within the dryer itself.

The rate of drying and the degree of drying can be regulated by carrying out the operation at a desired temperature by controlling the temperature of the inert atmosphere. Because during the major part of the drying cycle the material to be dried is still wet with solvent, the temperature of the material tends to approach the wet bulb temperature of the gas and the overall temperature of the material being dried is at a much lower level than the actual temperature of the circulating inert atmosphere; in this manner, material may be dried at a low temperature which protects heat-sensitive materials in an inert atmosphere which is actually warmer than the temperature of the material. The material is warmed up by the entering atmosphere only at the very end, just before it is removed from the system.

Of course, with particularly labile materials, it would be possible to have the atmosphere and the dried material move concurrently so that the hottest atmosphere would contact the wettest cake, and give an even cooler system; but the countercurrent circulation is in general more satisfactory and may be used with most dried solids by circulating sufficient of the inert atmosphere at such a temperature that the dried solids are not damaged thereby.

Having described, in general, certain features of my invention, as a specific embodiment thereof, there is shown in the attached drawing a system designed for drying a particular wet cake.

A wet feed is introduced into a hopper 11 which feeds a star sealed feeder 12. The sealed feeder feeds a wet cake which may be, for example, the result of a continuous centrifugation on a slurry containing a butanol extracted cake. This feed is dropped into the top of a conventional turbine type dryer 13. The turbine type dryer has a number of plates over which the dried solids are passed and by scrapers pass from plate to plate on down through to the discharge area. Any of the standard forms of dryers may be used. At the low point is a discharge hopper 14. The hopper is designed to receive the dried solids and pass them to a discharge conveyor 15. This discharge conveyor is conveniently a screw-type conveyor with a discharge plate 16 which bears against the solids being discharged, thereby insuring a reasonably tight seal against leakage of air. Near the bottom of discharge hopper 14 is the inert gas feed 17. The inert gas is pumped into the system by an inert gas blower 18 from a source of inert gas 19. As an inert gas, I prefer to burn air with natural gas in a combustion chamber which burns practically all of the oxygen to carbon dioxide and water, and remove the water. The discharge rate of the blower 18 is governed by an oxygen controller 27, later referred to. From the top of the dryer 13, the inert atmosphere containing the solvent vapors passes through an inert atmosphere blower 20 to a condenser 21. The condenser is shown as a tube condenser, in which the tubes are arranged vertically and surrounded by water as a cooling medium. The cooling medium passes in at an inlet 22 and out at an outlet 23.

At the top of the condenser is a solvent spray 35, which sprays solvent over the upper end of the condenser tubes and thereby removes any dust which might accumulate and also increases the heat transfer coefficient. At the lower end of the condenser is a sump 24 to accumulate the condensed solvent. The cooled inert atmosphere passes through an entrainment separator 25 to a heater 26 and back to the bottom of the dryer proper.

The heater, shown diagrammatically, is a group of steam coils containing steam at such pressure as to maintain the desired temperature in the recycled gas. A temperature between 160° F. and 300° F. gives good drying. An oxygen controller 27 measures the concentration of oxygen in the inert atmosphere and modifies the discharge rate of the blower 18 so as to maintain the desired oxygen concentration in the recycled inert atmosphere by adding a diluting quantity of inert gas. The oxygen content should be less than sufficient to form an explosive mixture with the solvent being removed.

A pressure controller 28 controls the pressure of the inert atmosphere by controlling the discharge rate of a purge blower 29. The purge blower may exhaust to a carbon-absorption system, which absorbs the solvent and from which the solvent may be recovered.

From the bottom of the sump 24 a condensate line 30 feeds the condensate to a condensate pump 31, which in turn discharges to a sludge separator 32, which is a settling type thickener, thus separating out the sludge and permitting the clarified condensate to discharge through the clarified condensate pump 33 to a clarified condensate tank 34 and from which the clarified condensate may be fed either to the solvent spray heads 35 or fed out as recovered solvent to be reused in the process.

As will be obvious, many modifications and details may be made in the system without deviating from my invention. For example, the pressure in the entire system may be kept below atmospheric or merely below atmospheric in the dryer proper. A quantity of inert gas may be controlled by either a continuous controller or by a stepwise controller, from periodic assays. A plurality of drying chambers or plurality of condensers may be used in conjunction with a single solvent clarification system or a plurality of units may be operated in parallel. The exact temperatures and feed rates vary over a wide rate, depending on the material to be dried and the temperatures at which it is operated. I have found that the temperature of approximately 220° F. for the inert atmosphere as it feeds into the dryer gives an extremely good recovery system when using the lower alcohols as solvents.

Other modifications and changes will suggest themselves to those skilled in the art. Duplicate instrumentation may be used for safety; and the system may be designed to automatically shut down if any component fails or becomes overloaded.

As my invention I claim:

1. An apparatus for continuously drying inflammable solvent-wet solids under reduced pressure and for continuously recovering both said inflammable solvent and said dried solids comprising a drying chamber, means connected thereto which continuously feeds inflammable solvent-wet solids into said drying chamber, sealing means associated with said means for feeding and with said drying chamber which prevents all but a minimum amount of air from entering said drying chamber through said feeding means, a dried solids discharge hopper in a lower portion of said drying chamber, an inert gas admission port entering said drying chamber, inert gas feed means connected to said inert gas admission port, oxygen measuring means connected to said drying chamber, a purge gas discharge means connected to said drying chamber, pressure-sensitive means connected to said purge gas discharge means which increases or decreases the speed of said purge gas discharge means, thus maintaining the desired reduced pressure in the drying chamber, a discharge conveyor immediately below said hopper, sealing means in said conveyor which prevents all but a minimum amount of air from entering said drying chamber through said conveyor and said hopper, a condenser, a sludge separation system connected to said condenser, an inert gas circulating blower connecting said condenser and said drying chamber, a return conduit connecting said condenser and said drying chamber, said circulating blower cycling said inert gas and said solvent to said condenser and re-cycling said inert gas back to said drying chamber through said return conduit, and heating means in said return conduit which heats said recycled inert gas.

2. The apparatus of claim 1, wherein said inert gas admission port is located in one of the walls of said dried solids discharge hopper.

3. The apparatus of claim 1, wherein there is a control means connecting said oxygen measuring means to said inert gas feed means whereby additional inert gas is automatically introduced into said drying chamber whenever the oxygen content of said drying chamber approaches an explosive level.

References Cited in the file of this patent

UNITED STATES PATENTS

| | | |
|---|---|---|
| 1,215,951 | Martini | Feb. 13, 1917 |
| 1,277,895 | Foster | Sept. 3, 1918 |
| 1,345,083 | Gerli et al. | June 29, 1920 |
| 1,371,914 | Lewis et al. | Mar. 15, 1921 |
| 1,381,002 | O'Neil | June 7, 1921 |
| 1,863,803 | Pantenburg | June 21, 1932 |
| 2,663,089 | Coats | Dec. 22, 1953 |